(12) United States Patent
Matsumoto et al.

(10) Patent No.: US 6,462,352 B1
(45) Date of Patent: Oct. 8, 2002

(54) RADIATION IMAGE STORAGE PANEL FOR DOUBLE-SIDE READING SYSTEM

(75) Inventors: Hiroshi Matsumoto; Hideki Suzuki; Katsuhiro Kohda, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/514,183

(22) Filed: Feb. 28, 2000

(30) Foreign Application Priority Data

Feb. 26, 1999 (JP) .......................................... 11-050947
Mar. 2, 1999 (JP) .......................................... 11-054539

(51) Int. Cl.$^7$ ............................. A61B 6/00; G01N 23/04
(52) U.S. Cl. ...................................... 250/582; 250/581
(58) Field of Search ................................ 250/582, 581, 250/580, 583, 584, 585, 588, 589

(56) References Cited

U.S. PATENT DOCUMENTS 5,534,710 A * 7/1996 Suzuki .................. 250/588
5,880,476 A * 3/1999 Suzuki .................. 250/588

* cited by examiner

Primary Examiner—Hung Xuan Dang
(74) Attorney, Agent, or Firm—Sughrue Mion, PLLC

(57) ABSTRACT

In a radiation image storage panel having a stimulable phosphor layer which is used in a radiation image recording and reproducing method composed of applying a stimulating light to one surface side of the phosphor layer and collecting stimulated emission from the phosphor layer on both surface sides, the phosphor layer preferably has a total optical transmittance, which is preferably within 2 to 20%, varying along depth of the phosphor layer at each of wavelengths of the stimulating light and the stimulated emission.

18 Claims, 1 Drawing Sheet

FIGURE
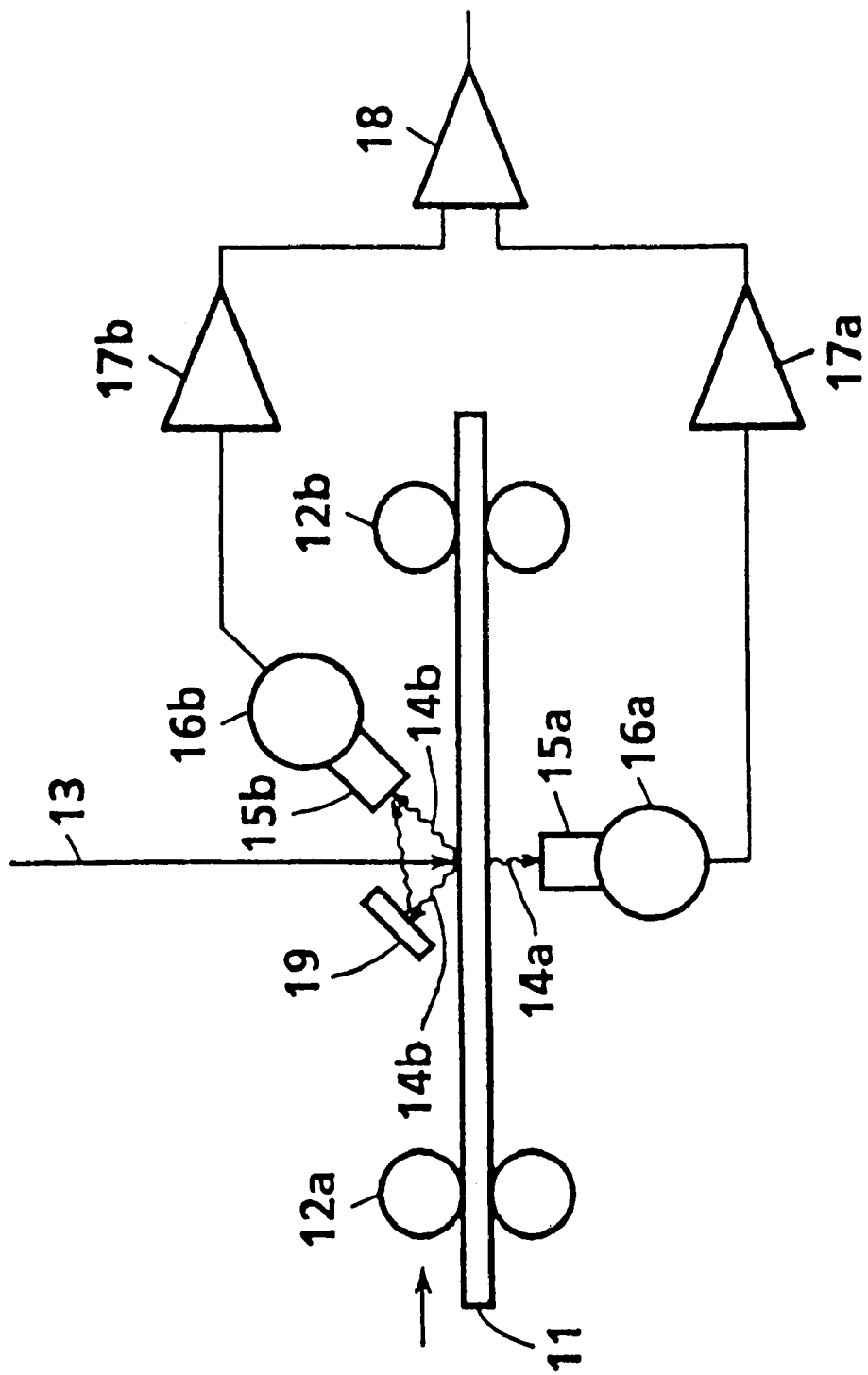

RADIATION IMAGE STORAGE PANEL FOR DOUBLE-SIDE READING SYSTEM

FIELD OF THE INVENTION

The present invention relates to a radiation image storage panel employed in a radiation image recording and reproducing method utilizing a double-side reading system.

BACKGROUND OF THE INVENTION

As a method replacing a conventional radiography, a radiation image recording and reproducing method utilizing a stimulable phosphor was proposed, and is practically employed. The method employs a radiation image storage panel (i.e., stimulable phosphor sheet) comprising a stimulable phosphor, and comprises the steps of causing the stimulable phosphor of the storage panel to absorb radiation energy having passed through an object or having radiated from an object; sequentially exciting the stimulable phosphor with an electromagnetic wave such as visible light or infrared rays (i.e., stimulating light) to release the radiation energy stored in the phosphor as light emission (i.e., stimulated emission); photoelectrically detecting the emitted light to obtain electric signals; and reproducing the radiation image of the object as a visible image from the electric signals. The panel thus treated is subjected to a step for erasing a radiation image remaining therein, and then stored for the next recording and reproducing procedure. Thus, the radiation image storage panel can be repeatedly employed.

In this method, a radiation image is obtainable with a sufficient amount of information by applying a radiation to the object at a considerably smaller dose, as compared with a conventional radiography using a combination of a radiographic film and radiographic intensifying screen.

The radiation image storage panel has a basic structure comprising a support and a stimulable phosphor layer provided thereon. However, if the phosphor layer is self-supporting, the support may be omitted. On the free surface (surface not facing the support) of the phosphor layer, a transparent protective film is generally placed to keep the phosphor layer from chemical deterioration or physical damage.

The phosphor layer usually comprises a binder and stimulable phosphor particles dispersed therein, but it may consist of agglomerated phosphor without binder. The phosphor layer containing no binder can be formed by deposition process or firing process. Further, the layer comprising agglomerated phosphor soaked with a polymer is also known. In any types of phosphor layers, the stimulable phosphor emits stimulated emission when excited with a stimulating light after having been exposed to a radiation such as X-rays. Accordingly, the radiation having passed through an object or radiated from an object is absorbed by the phosphor layer of the storage panel in proportion to the applied radiation dose, and a radiation image of the object is produced in the storage panel in the form of a latent radiation energy-stored image. The latent radiation energy-stored image can be released as stimulated emission by sequentially irradiating the panel with stimulating rays. The stimulated emission is then photoelectrically detected to give electric signals, so as to reproduce a visible image from the electric signals.

The radiation image recorded in the storage panel is generally read by the steps of applying a stimulating light to the front surface side (the phosphor layer side or the protective film side) of the storage panel, collecting light emitted by the phosphor particles by means of a light-collecting means from the same side, and photoelectrically converting the emitted light into digital signals corresponding to the radiation image. A system for reading the radiation image from one side of the storage panel in this manner is referred to as "single-side reading system". However, there is a case that the light emitted by the phosphor particles should be collected from both sides (i.e., the front and the back surface sides) of the storage panel. For instance, there is a case that the emitted light is desired to be collected as much as possible. There is also a case that the radiation image recorded in the phosphor layer varies along the depth of the phosphor layer, and that the variation is desired to be detected. A system for reading the image from both sides of the panel is referred to as "double-side reading system".

A radiation image storage panel employed in the double-side reading system, as well as a panel employed in the single-side reading system, is desired to be as sensitive as possible and to provide an image of high quality (high sharpness, high resolution, high graininess, etc.).

Generally, in a radiation image storage panel for the double-side reading system, the amount of the stimulated emission detected from the back surface side is considerably small as compared with that from the front surface side. Accordingly, the radiation image obtained from the back surface side is liable to have poor quality. The reason why the emission is detected from the back surface side in a less amount is thought to be as follows.

The stimulating light is applied onto only the front surface side of the panel (i.e., only the top surface side of the phosphor layer or the protective layer), and hence it insufficiently reaches phosphor particles near the bottom surface of the phosphor layer. In addition, since a transparent support is generally provided on the back (bottom) surface side of the panel, the emission taken from the support side is often weakened by the support.

For improving the image quality such as sharpness, it is desired to increase the amount of the stimulated emission detected from the back surface side.

SUMMARY OF THE INVENTION

It is an object of the present invention to provide a radiation image storage panel giving a radiation image of high quality which is employed in a radiation image recording and reproducing method utilizing a double-side reading system.

The inventors have studied about the aforementioned problems of a radiation image storage panel for a radiation image recording and reproducing method utilizing double-side reading system, and finally found the following facts.

The phosphor layer having an optical transmittance varying along the depth of the phosphor layer gives a radiation image with a high resolution (particularly in a low frequency region). If the transmittance in a part near the bottom surface of the phosphor layer is larger or higher than that in a part near the top surface, the stimulating light reaching the bottom part can be efficiently used and the emission radiating from the bottom surface can be effectively detected. Consequently, the quality of the radiation image obtained from the back surface side can be remarkably improved.

Otherwise, the stimulable phosphor layer of the radiation image storage panel to be used, specifically, in the double-side reading system preferably has a total optical transmittance of 2 to 20% at the maximum peak wavelength of the stimulation spectrum of the stimulable phosphor of the phosphor layer.

The present invention resides in a radiation image storage panel (Radiation Image Storage Panel-I) having a stimulable phosphor layer which is used in a radiation image recording and reproducing method comprising applying a stimulating light to one surface side (i.e., top surface side) of the phosphor layer and collecting stimulated emission from the phosphor layer on both surface sides (i.e., top surface side and bottom surface side), wherein the phosphor layer has an optical transmittance varying along depth of the phosphor layer at each of wavelengths of the stimulating light and the stimulated emission.

The invention also resides in a radiation image recording and reproducing method (Radiation Image Recording and Reproducing Method) which comprises the steps of:
  irradiating one surface of a radiation image storage panel with radiation having passed through an object or having been emitted by an object to record a radiation energy image of the object on the radiation image storage panel having a stimulable phosphor layer that has an optical transmittance varying along depth of the phosphor layer at each of wavelengths of stimulating light and stimulated emission;
  sequentially exciting the radiation image storage panel by applying the stimulating light to one surface of the storage panel to release the radiation energy recorded in the phosphor layer as the stimulated emission;
  photoelectrically detecting the stimulated emission from the excited surface and the opposite surface of the storage panel to obtain electric signals; and
  reproducing the radiation image of the object as a visible image from the electric signals.

The invention further resides in a radiation image storage panel (Radiation Image Storage Panel-II) comprising a transparent support film, a stimulable phosphor layer, and a transparent protective film, which is used in a radiation image recording and reproducing method comprising applying a stimulating light to one surface side of the phosphor layer and collecting stimulated emission from the phosphor layer on both surface sides, wherein the phosphor layer has a total optical transmittance in the range of 2 to 20% at a peak wavelength of a stimulation spectrum of the stimulable phosphor. The total optical transmittance includes an optical transmittance by way of diffusion transmission.

The invention furthermore resides in a radiation image storage panel (Radiation Image Storage Panel-III) comprising a transparent support film, a stimulable phosphor layer, and a transparent protective film, which is used in a radiation image recording and reproducing method comprising applying a stimulating light to one surface side of the phosphor layer and collecting stimulated emission from the phosphor layer on both surface sides, wherein the phosphor layer has an optical transmittance in the range of 2 to 20% at a peak wavelength of a stimulated emission spectrum of the stimulable phosphor.

The invention furthermore resides in a method for reading a radiation image storage panel (Radiation Image Reading Method) which comprises the steps of:
  applying a stimulating light to a radiation image storage panel comprising a transparent support film, a stimulable phosphor layer, and a transparent protective film, said phosphor layer having an optical transmittance in the range of 2 to 20% at a peak wavelength of a stimulation spectrum of the stimulable phosphor and containing a radiation energy, said stimulating light having a wavelength within ±20% of the maximum peak wavelength of the stimulation spectrum of the stimulable phosphor, through the transparent protective film, to release the radiation energy contained in the phosphor layer as stimulated emission;
  collecting the stimulating emission from both surface sides of the storage panel; and
  photoelectrically converting the collected emission to digital signals.

BRIEF DESCRIPTION OF THE DRAWING

FIG. 1 is a illustration showing a double-side reading system for a radiation image recording and reproducing method.

DETAILED DESCRIPTION OF THE INVENTION

The preferred embodiments of the invention are as follows.
(1) Radiation Image Storage Panel-I
  1) The optical transmittance on the surface side to which the stimulating light is applied is lower than that on the other surface side.
  2) The stimulable phosphor layer comprises two or more stimulable phosphors having different light reflectances and a stimulable phosphor having the maximum light reflectance resides predominantly on the surface side opposite to the surface side to which the stimulating light is applied.
  3) The stimulable phosphor layer comprises two or more stimulable phosphor sub-layers and the light transmittance of the sub-layer on the surface side to which the stimulating light is applied is lower than that of the sub-layer on the opposite surface side.
  4) The sub-layer on the surface side opposite to the surface side to which the stimulating light is applied has a light transmittance of 2 to 30% at each wavelength.
  5) The stimulable phosphor layer comprises two or more stimulable phosphors having different light reflectances and a stimulable phosphor having the maximum light reflectance resides predominantly in the sub-layer on the surface side opposite to the surface side to which the stimulating light is applied.
(2) Radiation Image Recording and Reproducing Method
  1) The optical transmittance on the surface side of the radiation image storage panel to which the stimulating light is applied is lower than that on the other surface side.
  2) The stimulable phosphor layer comprises two or more stimulable phosphors having different light reflectances and a stimulable phosphor having the maximum light reflectance resides predominantly on the surface side opposite to the surface side to which the stimulating light is applied.
(3) Radiation Image Storage Panel-II
  1) The phosphor layer of the radiation image storage panel has an optical transmittance in the range of 2 to 20% at a peak wavelength of a stimulated emission spectrum of the stimulable phosphor.
  2) The phosphor layer of the radiation image storage panel has a scattering length of 3 to 12 $\mu$m, said scattering length being measured at the maximum peak wavelength of the stimulation spectrum.
  3) The phosphor layer of the radiation image storage panel has a scattering length of 3 to 12 $\mu$m, said scattering length being measured at the maximum peak wavelength of the stimulated emission spectrum.
  4) The radiation image storage panel of claim 10, wherein the stimulable phosphor layer has a thickness of 100 to 380 $\mu$m.
(4) Radiation Image Storage Panel-III
  1) The phosphor layer of the radiation image storage panel has a scattering length of 3 to 12 $\mu$m, said scattering length being measured at the maximum peak wavelength of the stimulated emission spectrum.

2) The stimulable phosphor layer has a thickness of 100 to 380 μm.

In the preferred embodiments of Radiation Image Storage Panel-II and Radiation Image Storage Panel-III, the term of scattering length indicates a mean distance in which a light travels straight until it is scattered, and therefore a short scattering length means that the phosphor layer highly scatters a light. The scattering length can be determined by calculation according to Kubeluka-Munk theory. The details are given below.

First, three or more film samples are prepared. Each film sample has a different thickness, but made of the same components as the target surface protective layer. The thickness (μm) and the diffuse transmittance (%) of each sample are then measured. The diffuse transmittance (%) can be measured by means of a spectrophotometer equipped with an integrating sphere. In the below-described examples of the present specification, an automatic recording spectrophotometer (U-3210, manufactured by HITACHI, Ltd.) equipped with an integrating sphere of 150φ (150-0910) is used. The diffuse transmittance must be measured at a wavelength corresponding to the maximum peak (for instance, 600 nm) of the stimulation spectrum of the stimulable phosphor in the phosphor layer or a wavelength corresponding to the maximum peak (for instance, 400 nm) of the stimulated emission spectrum of the stimulable phosphor in the phosphor layer luminescence emitted by the phosphor contained in the phosphor layer.

From the thickness (μm) and the diffuse transmittance (%) obtained in the above measurements, the scattering length is calculated by the below-mentioned formulas which are derived from Kubeluka-Munk theory. For instance, the formulas can be easily derived, under the boundary condition of the diffuse transmittance (%), from the formulas 5.1.12 to 5.1.15 described in "Keikotai Handbook [in Japanese, Handbook of phosphor]", published by Ohm-sha, 1987, pp.403.

In the beginning, light strength distribution I(Z) is calculated using a thickness (d μm) of a phosphor layer, a reflectance ($d_0$) of the reflection layer, a scattering length (1/α) of the phosphor layer, and an absorption length (1/β) of the phosphor layer. I(Z) is then divided into i(Z) for a component advancing from the upper surface of the phosphor layer and j(Z) for a component advancing from the lower surface to the upper surface of the phosphor layer. Therefore, the relationship is written as follows:

$$I(Z)=i(Z)+j(Z)$$

Increase or decrease of strength by scattering/absorption at an optional depth in a film having a small thickness dz can be obtained by solving the following simultaneous differential equations according to Kubeluka-Munk theory:

$$di/dz=-(\beta+\alpha)i+\alpha j \quad (1)$$

$$di/dz=(\beta+\alpha)j-\alpha i \quad (2)$$

Assuming the conditions of $\gamma^2=\beta(\beta+2\alpha)$, $\xi=(\alpha+\beta-\gamma)/\alpha$, $\eta=(\alpha+\beta+\gamma)/\alpha$, and K and L for integration constants, the general solutions for i and j of the simultaneous equations are described below:

$$i(z)=Ke^{-\gamma z}+Le^{\gamma z}$$

$$j(z)=K\xi e^{-\gamma z}+L\eta e^{\gamma z}$$

The light transmittance T of a phosphor layer having a thickness d is described as follows:

$$T=i(d)/i(0)$$

Assuming that there is no returning light (namely, j(d)=0), a light transmittance T of the phosphor layer alone is calculated in terms of a function of the thickness d, as follows:

$$T(d)=(\eta-\xi)/(\eta e^{\gamma d}-\xi e^{-\gamma d}) \quad (3)$$

The light transmittance data measured by means of a spectrophotometer and data of the phosphor layer are processed according to the equation (3) and fitted by a method of least squares, to give an optimum 1/α and 1/β. Thus, the scattering length is determined as well as the absorption length.

The radiation image storage panel of the invention (Radiation Image Storage Panel-I) for double-side reading system can be produced by the process described below.

In the following description, the process for producing the radiation image storage panel having a phosphor layer consisting of two or more sub-layers is described as an example.

The transparent support is usually a transparent plastic resin sheet or film. Examples of the plastic resin materials include polyethylene terephthalate, polyethylene naphthalate, polyamide, polyimide, and aramid resin. However, the material for the support is not restricted to those examples, and a plastic resin material having enough strength and high transparency is preferably employed. The thickness of the support is generally in the range of 10 to 1,000 μm. If the phosphor layer is self-supporting, the support may be omitted. On the surface of the support facing the phosphor layer, an undercoating (adhesive) layer may be provided to increase adhesion between the support and the phosphor layer or to improve an image quality (in regard of sharpness and/or graininess) of the reproduced radiation image. The undercoating layer may contain an antistatic agent and/or light-scattering fine particles dispersed therein.

On the support, a stimulable phosphor layer comprising two or more sub-layers is provided. The phosphor layer preferably comprises two or more sub-layers having different optical transmittances at the wavelengths of the stimulating light and the stimulated emission. Preferably, the transmittance of the bottom sub-layer is higher than that of the top sub-layer. A typical stimulable phosphor layer or a typical sub-layer comprises a binder resin and stimulable phosphor particles dispersed therein.

As the stimulable phosphor, a phosphor giving a stimulated emission of a wavelength in the range of 300 to 500 nm when it is irradiated with stimulating light of a wavelength in the range of 400 to 900 nm is preferably employed. In Japanese Patent Provisional Publications No. 2(1990)-193100 and No. 4(1992)-310900, representative examples of the stimulable phosphors are described in detail. Examples of the preferred stimulable phosphors include europium or cerium activated alkaline earth metal halide phosphors, and cerium activated oxyhalide phosphors. However, they are by no means given to restrict the stimulable phosphor employable in the invention, and any other phosphors can be also employed, provided that these give stimulated emission when excited with a stimulating light after having been exposed to a radiation.

The stimulable phosphor layer consisting of two or more sub-layers having different optical transmittances at the wavelengths of the stimulating light and the stimulated emission is, for example, formed of at least two kinds of stimulable phosphors having different optical characteristics at these wavelengths. Each of those phosphors is incorporated into a different sub-layer to prepare sub-layers having different optical transmittances. The wavelengths of the stimulating light and the stimulated emission depend essentially on the chemical components of the stimulable phosphor, but are generally in the visible wavelength region described above. The stimulable phosphors having different optical characteristics (transmittance, reflectance, and others) can be prepared by varying the firing conditions (e.g., firing atmosphere). Each sub-layer may be prepared of either one of thus-prepared phosphors or plural kinds of them in a proper mixing ratio. Thus, at least two sub-layers having different transmittances can be formed. The top and the bottom sub-layers are preferably prepared from phosphors having lower and higher reflectances, respectively, so that the transmittance of the bottom sub-layer may be higher than that of the top one. The transmittance of the bottom sub-layer preferably is in the range of 2 to 30% at the wavelengths of the stimulating light and the stimulated emission. Not only in the optical characteristics but also in other conditions (e.g., mean particle size, chemical components), the stimulable phosphors to be used may differ from each other.

The multi-layered stimulable phosphor layer (consisting of two or more sub-layers) can be formed, for example, in the following manner.

First, two or more kinds of phosphor dispersions in which stimulable phosphor particles having different particle sizes are dispersed are prepared. The stimulable phosphor particles and a binder are added to a solvent, and mixed well to prepare a phosphor dispersion in which the phosphor particles are uniformly dispersed in an organic solution of the binder.

Examples of the binders include natural polymers such as proteins (e.g., gelatin), polysaccharides (e.g., dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, linear polyester, and thermoplastic elastomers. These may be crosslinked with a crosslinking agent.

Examples of the solvents employable in the preparation of the phosphor dispersion include lower aliphatic alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower aliphatic alcohols with lower aliphatic acids such as methyl acetate, ethyl acetate and butyl acetate; ethers such as dioxane, ethylene glycol monoethyl ether, ethylene glycol monomethyl ether and tetrahydrofuran; and mixtures of the above-mentioned compounds.

The ratio between the binder and the phosphor in the phosphor dispersion depends on the characteristics of the stimulable phosphor and the aimed property of the storage panel, but generally they are incorporated at a ratio of 1:1 to 1:100 (binder:phosphor, by weight), preferably 1:8 to 1:40. The phosphor dispersion may further contain various additives such as dispersing agents (for assisting the phosphor particles in dispersing), plasticizers (for increasing the bonding between the binder and the phosphor particles), anti-yellowing agents (for inhibiting yellowing of the phosphor layer), hardening agents, and/or crosslinking agents.

Thus, at least two kinds of phosphor dispersions containing a binder and phosphor particles of different particle sizes can be prepared. The phosphor dispersion is then evenly coated on the surface of a support, and dried to form a sub-layer film. The coating procedure can be carried out using a conventional means such as a doctor blade, a roll coater, or a knife coater. The sub-phosphor layer film can be prepared by repeating the coating procedure using each phosphor dispersion liquid. The coating procedure can be done to form plural sub-layers one on another successively, or by simultaneously coating the plural kinds of phosphor dispersions by a simultaneous superposition coating method to form a composite of sub-layers at a time.

Alternatively, the phosphor layer may be prepared in the following manner. Each phosphor dispersion is coated on a temporary support (e.g., a glass plate, a metal plate, a plastic sheet) and dried to form a phosphor film for each sub-layer, and then thus prepared phosphor films are superposed one on another and fixed on a permanent support by pressing or using an adhesive agent. In this case, a phosphor sheet to be placed on the support may be reversed and fixed on the support. In thus formed phosphor layer, the outer part (i.e., part near the front or the back surface) contains a relatively large amount of the binder while the inner part contains a relatively small amount of the binder. The phosphor layer having such structure gives a reproduced radiation image of further improved quality.

Thus, the phosphor layer composed of two or more sub-layers can be prepared on the support.

The phosphor layer may be composed of two sub-layers [i.e., the upper (top) and lower (bottom) sub-layers], or may be composed of three or more sub-layers. If the sub-layers are formed using the same binder and/or solvent, the interfaces therebetween are not always clear. The thickness of each sub-layer may be determined according to various conditions (e.g., characteristics of the target radiation image storage panel, the nature of the phosphor employed, the mixing ratio between the binder and the phosphor), and generally is in the range of 20 $\mu$m to 1 mm (preferably 50 to 500 $\mu$m).

The phosphor layer generally comprises a binder and stimulable phosphor particles dispersed therein, but it may consist of agglomerated phosphor without binder. Further, the phosphor layer may comprise agglomerated phosphor soaked with a polymer.

A transparent protective film may be placed on the free surface (surface not facing the support) of the stimulable phosphor layer to keep the layer from chemical deterioration or physical damage. The protective film can be prepared by various method, for example, by coating on the phosphor layer a solution in which transparent polymer material (e.g., cellulose derivatives, polymethyl methacrylate, or organic solvent soluble-fluorocarbon resin) is dissolved in an appropriate solvent, by fixing a transparent resin film (e.g., a glass plate, or a film of organic polymer such as polyethylene terephthalate) on the phosphor layer via adhesive, or by depositing inorganic materials on the phosphor layer. In the protective film, various additives (e.g., light-scattering fine particles such as magnesium oxide, zinc oxide, and titanium oxide; slipping agent such as perfluoroolefin resin powder and silicone resin powder; crosslinking agent such as polyisocyanate) may be incorporated. The thickness of the protective film is generally in the range of approx. 0.1 to 20 $\mu$m.

In the manner described above, Radiation Image Storage Panel-I can be prepared. The stimulable phosphor layer does not need to have the above-described multi-layered structure, and it may be a single layer in which a stimulable phosphor having a higher reflectance is contained more in a part near the bottom surface than in a part near the top surface so that the light transmittance of the bottom part may be higher than that of the top part.

The radiation image storage panel of the invention may be modified in various known ways. For example, in order to improve the sharpness of a reproduced radiation image, at least one of the layers may be colored with a coloring agent that does not absorb stimulated emission but the stimulating light.

The radiation image storage panels of the invention (Radiation Image Storage Panel-II and Radiation Image Storage Panel-III) for double-side reading system can be produced by almost the same procedures described for the production of Radiation Image Storage Panel-III. Although a radiation image storage panel according to the Radiation Image Storage Panel-II or -III has a phosphor layer composed of plural sub-phosphor layers, the radiation image storage panel may be composed of a single phosphor layer.

The double side-reading system for the radiation image recording and reproducing method is now described by referring to Figure given in the attached Drawing.

In Figure, the radiation image storage panel 11 is conveyed by means of a pair of nip rollers 12a and 12b. The stimulating light 13 such as a laser beam (the stimulating light preferably has a wavelength within ±5% of the maximum peak wavelength of the stimulation spectrum of the stimulable phosphor) is applied onto the top surface of the storage panel 11, and the stimulated emission radiated from the inside of the storage panel 11 is detected from both of the top and bottom surface sides. The stimulated emission 14a emitted from the bottom surface is collected with a light-collecting guide 15a provided below, and photoelectrically converted into a series of electric signals by means of an opto-electric conversion device (e.g., photomultiplier tube) 16a attached to the light-collecting guide 15a. The signals thus obtained from the bottom surface side of the storage panel are amplified in an amplifier 17a, and then transferred to a data processor 18. On the other hand, the stimulated emission 14b emitted from the top surface is, directly or via a mirror 19, collected by a light-collecting guide 15b provided above, and photoelectrically converted into a series of electric signals by means of an opto-electric conversion device (e.g., photomultiplier tube) 16b attached to the light-collecting guide 15b. The signals thus obtained from the top surface side of the storage panel are amplified in an amplifier 17b, and then transferred to the data processor 18. In the data processor 18, the signals transferred from the amplifiers 17a and 17b are combined and subjected to predetermined operation processes (e.g., addition, subtraction) according to the characteristics of the desired radiation image, so as to obtain the desired radiation image signals.

The radiation image storage panel 11 thus treated is then conveyed in the direction of the arrow by means of the nip rollers 12a and 12b, and successively exposed to erasing light radiated from the erasing light sources (not illustrated) for performing the erasing procedure.

The present invention is further described by the following examples.

EXAMPLE 1

(1) Preparation of Stimulable Phosphors

Raw powders of BaFBr:Eu and BaFI:Eu were independently prepared. Each powder contained, per 1 mol. of Ba, $5 \times 10^{-3}$ mol. of Eu activator, $1 \times 10^{-3}$ mol. of K additive, $1 \times 10^{-3}$ mol. of Cs additive, and $1 \times 10^{-3}$ mol. of Ca additive. The raw powders were mixed so that the ratio of Br/I would be 85/15, and 1 wt. % of alumina fine particles were added so as to avoid sintering. The mixture was well mixed in a mixer, and 3 kg of thus prepared mixture was placed in a quartz boat. In a firing furnace equipped with a quartz firing tube (in which firing atmosphere could be controlled), the boat was placed and fired at 850° C. for 2 hours under an atmosphere containing a small amount of oxygen gas. After the firing was complete, the boat was cooled to room temperature by evacuating the atmospheric gas by a vacuum pump. Thus, the desired $BaFBr_{0.85}I_{0.15}:Eu^{2+}$ phosphor was prepared. The procedure was repeated except for varying the condition of the oxygen gas atmosphere, to prepare two kinds of tetradecahedral $BaFBr_{0.85}I_{0.15}:Eu^{2+}$ phosphors having different optical reflectances. In these procedures, the sizes of the raw powders were changed to prepare two kinds of the phosphor particles having different mean particle sizes (corresponding to the peaks of particle size distributions) of 6 $\mu$m and 3 $\mu$m. Consequently, four kinds of the stimulable phosphors were prepared.

(2) Preparation of Phosphor Sheet A

| | | |
|---|---|---|
| Phosphor: | a mixture of Phosphor $a_1$ (having a lower optical reflectance and a mean particle size of 6 $\mu$m) and Phosphor $a_2$ (having a lower optical reflectance and a mean particle size of 3 $\mu$m) in a weight ratio of 7:3 | 200 g |
| Binder: | polyurethane elastomer (Pandex T-5265H (solid), Dai-nippon Ink & Chemicals, Inc.) | 6.4 g |
| Crosslinking agent: | (polyisocyanate resin, Colonate HX (solid content: 100%), Nippon Polyurethane Co., Ltd.) | 0.6 g |
| Anti-yellowing agent: | (epoxy resin, Epikote #1001 (solid), Yuka Shell Epoxy Kabushiki Kaisha) | 3 g |

The above-mentioned materials were added to methyl ethyl ketone, and mixed by means of a propeller mixer to prepare a phosphor dispersion having a viscosity of 30 ps at 25° C. (binder/phosphor: 1/20, by weight). The prepared phosphor dispersion was coated by a doctor blade on a temporary support (polyethylene terephthalate sheet having a beforehand coated silicon releasing agent) of 180 $\mu$m thick, and dried to form a phosphor film. The phosphor film was then peeled from the temporary support to give a phosphor sheet A (thickness: 220 $\mu$m, width: 300 mm).

(3) Preparation of Phosphor Sheet B

The procedure of (2) was repeated except for using, as the phosphor, 200 g of a mixture of Phosphor $b_1$ (having a higher optical reflectance and a mean particle size of 6 $\mu$m) and Phosphor $b_2$ (having a higher optical reflectance and a mean particle size of 3 $\mu$m) in a weight ratio of 7:3, to prepare a phosphor sheet B (thickness: 220 $\mu$m, width: 300 mm).

(4) Preparation of Stimulable Phosphor Layer

A polyethylene terephthalate sheet (thickness: 250 $\mu$m, degree of haze (typical): 20; Lumilar S-10, Toray Industries, Inc.) was prepared. On one surface of the sheet, an unsaturated polyester resin solution (a mixture of Byron 300 and Byron 200 in a weight ratio of 7:3, Toyobo Co., Ltd.) was coated and dried to form a transparent adhesive layer (thickness: 15 $\mu$m). On the adhesive layer, the above-prepared stimulable phosphor sheet B was placed so that the upper surface, which had not been in contact with the temporary support in the procedure (3), would be in contact with the adhesive layer. The thus-prepared layered composition was then pressed under heating by means of a calender roll (metal rolls, roll diameter: 200 mm, total weight: 1.6 t, temperature of the upper roll: 45° C., temperature of the lower roll: 45° C., transferring rate: 0.3 m/minute), so that the pressed phosphor sheet B would be provided on the adhesive layer.

On the pressed phosphor sheet B, the phosphor sheet A was placed so that the lower surface, which had been in contact with the temporary support in the procedure (2), would be in contact with the pressed phosphor sheet B. The thus-prepared composition was then pressed under heating by means of a calender roll (total weight: 2.5 t, temperature of the upper roll: 45° C., temperature of the lower roll: 45° C., transferring rate: 0.3 m/minute), so that a stimulable phosphor layer consisting of the phosphor sheets B and A (total thickness: 320 μm) would be completely fixed onto the support (polyethylene terephthalate sheet) via the adhesive layer.

(5) Preparation of Transparent Protective Film

On the stimulable phosphor layer, a polyethylene terephthalate film (thickness: 6 μm) provided with a polyester adhesive layer (thickness: 1.5 μm) on one side surface was overlaid so that the adhesive layer would be in contact with the phosphor layer. The thus-prepared layered composition was then pressed under heating by means of a heating roll at 90 to 100° C., to fix the film to the phosphor layer. The layered composition was further heated and pressed by an embossing roll so that the surface roughness (Ra) would become in the range of 0.1 to 0.4 μm.

| | | |
|---|---|---|
| Fluorocarbon resin: | fluoroolefin-vinyl ether copolymer (Lumiflon LF-504X [30% xylene solution], Asahi Glass Co., Ltd.) | 92 g |
| Crosslinking agent: | polyisocyanate (Sumijule N3500 [solid content: 100%], Sumitomo Bayer Urethane, Inc.) | 5 g |
| Slipping agent: | silicone modified with alcohol (X-22-2809 [66% xylene-containing paste], The Shin-Etsu Chemical Co., Ltd.) | 0.5 g |
| Light-scattering fine particles: | melamine-formaldehyde filler (Epostar S6, Nippon Shokubai Co., Ltd.) | 6.5 g |
| Coupling agent: | acetoalkoxyaluminum diisopropionate (Plane-act A1-M, Ajinomoto Co., Inc.) | 0.1 g |
| Catalyst: | dibutyl tin dilaurate (KS1260, Kyodo Yakuhin Co., Ltd.) | 0.35 mg |

The above-mentioned materials were mixed to prepare a fluorocarbon resin coating liquid, and the liquid was coated by a doctor blade on the polyethylene terephthalate film provided on the phosphor layer. The applied liquid was heated to harden and dry at 120° C. for 20 minutes, to form a resin layer (thickness: 1.5 μm), to produce a protective film consisting of the polyethylene terephthalate film and the resin layer on the phosphor layer.

Thus, a radiation image storage panel of the invention comprising a transparent support, a stimulable phosphor layer consisting of the phosphor sheets (sub-layers) B and A, and a protective film was prepared.

Comparison Example 1

The procedures of Example 1 were repeated except that the phosphor sheet A was used in place of the phosphor sheet B in the step (4) to form a stimulable phosphor layer (total thickness: 320 μm) consisting of the phosphor sheets (sub-layers) A and A, to prepare a radiation image storage panel for comparison.

Comparison Example 2

The procedures of Example 1 were repeated except that the phosphor sheet B was used in place of the phosphor sheet A in the step (4) to form a stimulable phosphor layer (total thickness: 320 μm) consisting of the phosphor sheets (sub-layers) B and B, to prepare a radiation image storage panel for comparison.

Evaluation of Radiation Image Storage Panel

Sharpness and graininess of a radiation image reproduced using the each radiation image storage panel were measured to evaluate the prepared radiation image storage panel. Further, the optical transmittance of each phosphor sub-layer was also measured.

(1) Optical Transmittance

Each of the phosphor dispersions for the phosphor sheets A and B was independently coated by a doctor blade on a temporary support (polyethylene terephthalate sheet having a beforehand coated silicon releasing agent) of 180 μm thick, and dried to form a phosphor film. The phosphor film thus formed was then peeled from the temporary support to give the phosphor sheets A and B (each thickness: 300 μm). The optical transmittance of each phosphor sheet at 650 nm (stimulation wavelength for $BaFBr_{0.85}I_{0.15}:Eu^{2+}$ phosphor) or 410 nm (wavelength of the stimulated emission of that phosphor) was measured by means of a photospectrometer (U-3210, Hitachi Ltd.) equipped with a 150ϕ integrating sphere for collecting scattered components of the light.

(2) Image Quality (Sharpness and Graininess)

After the sample storage panel was exposed to X-rays (generated under 80 kVp) through an MTF chart, the stimulable phosphor in the storage panel was excited with a laser light (wavelength: 660 nm). The stimulated emission was detected from both sides of the storage panel using photomultiplier tubes (S-5), and converted into electric signals. The electric signals thus obtained from both sides were accumulated to obtain image signals. The signals were subjected to the operation processing, and then the image was reproduced and recorded on a silver halide photographic film by means of a film scanner.

The obtained image was visually observed. According to the observation, the sharpness and the graininess of the image given by each storage panel were evaluated and classified into the following grades based on those of Comparison Example 1:

+2: Excellent

+1: Good

0: Standard (Comparison Example 1)

−1: Poor

−2: Very Poor.

The results are set forth in Tables 1 and 2.

TABLE 1

| | transmittance (%) | |
|---|---|---|
| | 410 nm | 650 nm |
| phosphor sheet (sub-layer) A | 3.9 | 5.3 |
| phosphor sheet (sub-layer) B | 4.8 | 6.0 |

TABLE 2

| | Ex. 1 | Com. Ex. 1 | Com. Ex. 2 |
|---|---|---|---|
| Structure | | | |
| upper sub-layer | A | A | B |
| lower sub-layer | B | A | B |

TABLE 2-continued

|  | Ex. 1 | Com. Ex. 1 | Com. Ex. 2 |
|---|---|---|---|
| Image Quality | | | |
| sharpness | +1 | 0 | 0 |
| graininess | +2 | 0 | 0 |

The results in Tables 1 and 2 indicate that the radiation image storage panel of the invention (storage panel of Example 1, comprising a phosphor layer consisting of the upper sub-layer having a relatively low transmittance and the lower sub-layer having a relatively high transmittance) gives better image quality (both sharpness and graininess) than the conventional storage panel (Comparison Example 1). On the other hand, the storage panel for comparison (panel of Comparison Example 2, comprising a phosphor layer consisting of the upper and the lower sub-layers both of which have high transmittances) gives sharpness and graininess similar to those given by the conventional storage panel (Comparison Example 1).

EXAMPLE 2

(1) Preparation of Stimulable Phosphor Film 200 g of a stimulable divalent europium activated barium florobromoiodide phosphor (BaFBr$_{0.085}$I$_{0.15}$: Eu$^{2+}$, mean particle size: 5 μm), 40 g of 20 wt. % methyl ethyl ketone solution of polyurethane resin (Pandex T5265M, Dai-nippon Ink and Chemical Industries, Co., Ltd.), 2 g of Bisphenol A-type epoxy resin, and methyl ethyl ketone were mixed by a propeller mixer to give a phosphor dispersion in which the solid binder (polyurethane resin+epoxy resin) and the phosphor particle was mixed in a ratio of 1:20 by weight. The phosphor dispersion was coated uniformly by a doctor blade on a polyethylene terephthalate film (temporary support having a beforehand coated releasing agent: thickness: 250 μm) which was fixed onto a glass plate. The temporary support having the coated phosphor dispersion was placed in a dryer and gradually heated in the dryer from 25° C. to 100° C. to dry the coated dispersion. The dried coated film was separated from the temporary support to give a stimulable phosphor film.

(2) Preparation of Radiation Image Storage Panel

Two stimulable phosphor films were prepared in the manner as described above. One phosphor film was reversed and placed on a transparent polyethylene terephthalate film (support) having a transparent polyester resin adhesive pre-coat (thickness: 5 μm) in such manner that the surface of the phosphor film on the side which had been in contact with the temporary support was not brought into contact with the adhesive coat. Thus produced composite was then pressed under heating to 60° C. (temperature higher than the softening temperature of the binder) in a calender roll, to give a well combined composite. Then, another phosphor film was placed on the phosphor layer of the composite, in such manner that the surface of the phosphor film on the side which had been in contact with the temporary support was brought into contact with the phosphor layer of the composite, and pressed under heating in the manner described above, to give a composite comprising a support and a stimulable phosphor layer composed of two stimulable phosphor layers.

On the stimulable phosphor layer of the composite, a transparent polyethylene terephthalate film (thickness: 6 μm) having a polyester resin adhesive layer was placed and fixed onto the phosphor layer.

Thus, a radiation image storage panel according to the invention was prepared. The stimulable phosphor layer (which was prepared by pressing two phosphor films under heating) had a thickness of 270 μm.

EXAMPLES 3 TO 6

Two stimulable phosphor films were prepared from the same stimulable phosphor dispersion according to the procedures of Example 2(1) but changing the clearance of the doctor blade so as to give to the phosphor films having a thickness differing from that of the stimulable phosphor film of Example 2(1).

The above-mentioned procedures were repeated by further varying the clearance of the doctor blade to produce two stimulable phosphor films.

The prepared two stimulable phosphor films were processed in the manner described in Example 2(2), to produce a radiation image storage panel of the invention.

The radiation image storage panels produced in Examples 3 to 6 had a phosphor layer (composed of pressed two phosphor films) of the following thickness:

Example 3: 109 μm,

Example 4: 165 μm,

Example 5: 223 μm,

Example 6: 365 μm.

Comparison Examples 3 to 4

Two stimulable phosphor films were prepared from the same stimulable phosphor dispersion according to the procedures of Example 2(1) but changing the clearance of the doctor blade so as to give to the phosphor films having a thickness differing from that of the stimulable phosphor film of Example 2(1).

The above-mentioned procedures were repeated by further varying the clearance of the doctor blade to produce two stimulable phosphor films.

The prepared two stimulable phosphor films were processed in the manner described in Example 2(2), to produce a radiation image storage panel for comparison.

The radiation image storage panels produced in Comparison Examples 3 to 4 had a phosphor layer (composed of pressed two phosphor films) of the following thickness:

Comparison Example 3: 400 μm,

Comparison Example 4: 78 μm.

EXAMPLES 7 TO 9

Two stimulable phosphor films were prepared from the same stimulable phosphor dispersion except for using the stimulable phosphor of particle size of 8 μm, according to the procedures of Example 2(1) but changing the clearance of the doctor blade so as to give to the phosphor films having a thickness differing from that of the stimulable phosphor film of Example 2(1).

The above-mentioned procedures were repeated by further varying the clearance of the doctor blade to produce two stimulable phosphor films.

The prepared two stimulable phosphor films were processed in the manner described in Example 2(2), to produce a radiation image storage panel of the invention.

The radiation image storage panels produced in Examples 7 to 9 had a phosphor layer (composed of pressed two phosphor films) of the following thickness:

Example 7: 140 μm,

Example 8: 305 μm,

Example 9: 398 μm.

Comparison Examples 5 to 6

Two stimulable phosphor films were prepared from the same stimulable phosphor dispersion except for using the stimulable phosphor of particle size of 8 µm, according to the procedures of Example 2(1) but changing the clearance of the doctor blade so as to give to the phosphor films having a thickness differing from that of the stimulable phosphor film of Example 2(1).

The above-mentioned procedures were repeated by further varying the clearance of the doctor blade to produce two stimulable phosphor films.

The prepared two stimulable phosphor films were processed in the manner described in Example 2(2), to produce a radiation image storage panel for comparison.

The radiation image storage panels produced in Comparison Examples 5 to 6 had a phosphor layer (composed of pressed two phosphor films) of the following thickness:

Comparison Example 5: 95 µm,

Comparison Example 6: 510 µm.

EXAMPLES 10 TO 12

One stimulable phosphor film was prepared from the same stimulable phosphor dispersion except for using the stimulable phosphor of particle size of 3 µm and dyeing the phosphor film with ultramarine blue (ultramarine blue was previously dispersed in an independently prepared binder solution), according to the procedures of Example 2(1) but changing the clearance of the doctor blade so as to give to the phosphor films having a thickness differing from that of the stimulable phosphor film of Example 2(1).

The prepared stimulable phosphor film was placed as such on the support and then processed in the manner described in Example 2(2), to produce a radiation image storage panel of the invention.

The radiation image storage panels produced in Examples 10 to 12 had a phosphor layer of the following thickness:

Example 10: 110 µm (ultramarine blue: 0 mg),

Example 11: 110 µm (ultramarine blue: 3 mg),

Example 12: 110 µm (ultramarine blue: 30 mg).

Comparison Examples 7 to 8

One stimulable phosphor film was prepared from the same stimulable phosphor dispersion except for using the stimulable phosphor of particle size of 3 µm and dyeing the phosphor film with ultramarine blue (ultramarine blue was previously dispersed in an independently prepared binder solution), according to the procedures of Example 2(1) but changing the clearance of the doctor blade so as to give to the phosphor films having a thickness differing from that of the stimulable phosphor film of Example 2(1).

The prepared stimulable phosphor film was placed as such on the support and then processed in the manner described in Example 2(2), to produce a radiation image storage panel for comparison.

The radiation image storage panels produced in Comparison Examples 7 to 8 had a phosphor layer of the following thickness:

Comparison Example 7: 79 µm (ultramarine blue: 0 mg),

Comparison Example 8: 110 µm (ultramarine blue: 150 mg).

EXAMPLES 13 TO 16

Two stimulable phosphor films were prepared from the same stimulable phosphor dispersion except for varying the weight ratio between the solid binder resin component and the stimulable phosphor, according to the procedures of Example 2(1) so as to give to the phosphor films.

The prepared two stimulable phosphor films were processed in the manner described in Example 2(2), to produce a radiation image storage panel of the invention.

The radiation image storage panels produced in Examples 13 to 16 had a phosphor layer (composed of pressed two phosphor films) of the following thickness and ratio (solid binder resin component: stimulable phosphor, by weight):

Example 13: 270 µm (1:40),

Example 14: 270 µm (1:30),

Example 15: 270 µm (1:20),

Example 16: 270 µm (1:7).

Comparison Examples 9 to 10

Two stimulable phosphor films were prepared from the same stimulable phosphor dispersion except for varying the weight ratio between the solid binder resin component and the stimulable phosphor, according to the procedures of Example 2(1) so as to give to the phosphor films.

The prepared two stimulable phosphor films were processed in the manner described in Example 2(2), to produce a radiation image storage panel for comparison.

The radiation image storage panels produced in Comparison Examples 9 to 10 had a phosphor layer (composed of pressed two phosphor films) of the following thickness and ratio (solid binder resin component: stimulable phosphor, by weight):

Comparison Example 9: 270 µm (1:60),

Comparison Example 10: 270 µm (1:5).

Evaluation of Radiation Image Storage Panel

The radiation image storage panels produced in the examples and comparison examples were evaluated in the manners described below.

(1) Total Optical Transmittance of Phosphor Layer

The total optical transmittance (including transmittance caused by diffusion transmission) of the stimulable phosphor layer was measured in the following using U-3210 type Self-Recordable Spectrophotometer (available from Hitachi, Ltd.).

The optical transmittance of a combination of the polyethylene terephthalate support having an adhesive layer and the polyethylene terephthalate protective film having an adhesive layer was set to 100%, and the total optical transmittances of the radiation image storage panels of Examples and Comparison Examples were measured. The total optical transmittance was measured at a wavelength of 633 nm (corresponding to the wavelength of the stimulating light and also corresponding to the maximum peak wavelength of the stimulation spectrum of the employed stimulable phosphor) and further at a wavelength of 403 nm (corresponding to the maximum peak wavelength of the stimulated emission spectrum of the employed stimulable phosphor).

(2) Measurement of Quantity of Stimulated Emission

X rays were irradiated onto a protective film of radiation image storage panel by applying a voltage of 80 kVp to a tungsten valve tube. Subsequently, a laser light (wavelength: 633 nm) was irradiated on the protective film at a stimulating energy of 4.8 J/m$^2$, and a stimulated emission was detected by a pair of photomultiplier tubes provided on the upper surface side (protective film side) as well as on the lower surface side (support side), to measure a stimulated emission on either side. The measured emission values were expressed as a lower side emission in the term of a ratio of the stimulated emission detected on the support side against the stimulated emission detected on the protective film side.

(2) Image Quality

After a radiation image storage panel was exposed to X-rays (generated under 80 kVp) through an MTF chart, the stimulable phosphor in the storage panel was excited with a laser light (wavelength: 660 nm). The stimulated emission was detected from both sides of the storage panel using photomultiplier tubes (S-5), and converted into electric signals. The electric signals thus obtained from both sides were accumulated to obtain image signals. The signals were subjected to the operation processing, and then the image was reproduced and recorded on a silver halide photographic film by means of a film scanner.

The reproduced radiation image was visually observed for evaluating sharpness and graininess of the radiation image. According to the observation, the sharpness and the graininess of the image given by each storage panel were evaluated and classified into the following grades based on those of Comparison Example 1:

+2: Excellent
+1: Good
0: Standard (Comparison Example 1)
−1: Poor
−2: Very Poor.

(4) Scattering Length and Absorption Length of Phosphor Layer

According to the measurement procedures described hereinbefore, a scattering length and an absorption length were determined on the stimulable phosphor layer at a stimulating wavelength and a wavelength of stimulated emission.

TABLE 3

| Example | Thickness phosphor layer ($\mu$m) | Transmittance ($\lambda$ of stimulation/ $\lambda$ of emission) | Lower side stimulated emission | Sharpness/ Graininess |
|---|---|---|---|---|
| Example 2 | 275 | 5.2%/4.3% | 0.38 | +1/0 |
| Example 3 | 109 | 15.7%/14.1% | 0.63 | +1/0 |
| Example 4 | 165 | 9.9%/8.8% | 0.53 | +1/0 |
| Example 5 | 223 | 6.8%/6.1% | 0.47 | +1/0 |
| Example 6 | 365 | 2.9%/2.1% | 0.26 | +1/0 |
| Com. Ex. 3 | 400 | 1.7%/1.3% | 0.12 | 0/0 |
| Com. Ex. 4 | 78 | 24%/22% | 0.75 | +1/−2 |

Common Remarks for Examples 2–6 and Comparison Examples 3–4
  phosphor particle average size: 5 $\mu$m
  binder resin component/phosphor: 1/20, by weight
  scattering length at stimulation wavelength: 10.5 $\mu$m
  scattering length at stimulated emission wavelength: 9.7 $\mu$m
  absorption length at stimulation wavelength: 1.4 mm
  absorption length at stimulated emission wavelength: 1.2 mm

TABLE 4

| Example | Thickness phosphor layer ($\mu$m) | Transmittance ($\lambda$ of stimulation/ $\lambda$ of emission) | Lower side stimulated emission | Sharpness/ Graininess |
|---|---|---|---|---|
| Example 7 | 140 | 16.5%/15.1% | 0.6 | 0/+1 |
| Example 8 | 305 | 6.5%/5.7% | 0.35 | 0/+1 |
| Example 9 | 398 | 2.8%/2.3% | 0.21 | 0/+1 |
| Com. Ex. 5 | 95 | 26.3%/24.3% | 0.79 | +1/−2 |
| Com. Ex. 6 | 510 | 1.2%/1% | 0.11 | −1/0 |

Common Remarks for Examples 7–9 and Comparison Examples 5–6
  phosphor particle average size: 8 $\mu$m
  binder resin component/phosphor: 1/20, by weight
  scattering length at stimulation wavelength: 11.9 $\mu$m
  scattering length at stimulated emission wavelength: 11.1 $\mu$m
  absorption length at stimulation wavelength: 1.4 mm
  absorption length at stimulated emission wavelength: 1.2 mm

TABLE 5

| Example | Thickness phosphor layer ($\mu$m) | Transmittance ($\lambda$ of stimulation/ $\lambda$ of emission) | Lower side stimulated emission | Sharpness/ Graininess |
|---|---|---|---|---|
| Example 10 | 110 | 18%/16.2% | 0.55 | +2/−1 |
| Example 11 | 110 | 9%/12.3% | 0.25 | +2/−1 |
| Example 12 | 110 | 3%/7.5% | 0.16 | +3/−1 |
| Com. Ex. 7 | 79 | 24.5%/24.3% | 0.72 | +2/−2 |
| Com. Ex. 8 | 110 | 1.1%/1.9% | 0.13 | 0/−2 |

Remarks for Examples 10–12 and Comparison Examples 7–8
  amount of ultramarine:
    0 mg (Example 10),
    3 mg (Example 11),
    30 mg (Example 12),
    0 mg (Com. Ex. 7),
    150 mg (Com. Ex. 8).
  absorption length at stimulation wavelength:
    1.4 mm (Example 10),
    0.8 mm (Example 11),
    0.5 mm (Example 12),
    1.4 mm (Com. Ex. 7),
    0.3 mm (Com. Ex. 8).
Remarks for Examples 10–12 and Comparison Examples 7–8
  phosphor particle average size: 3 $\mu$m
  binder resin component/phosphor: 1/20, by weight
  scattering length at stimulation wavelength: 7.2 $\mu$m
  scattering length at stimulated emission wavelength: 6.4 $\mu$m
  absorption length at stimulated emission wavelength: 1.2 mm

TABLE 6

| Example | Binder/ phosphor ratio | Transmittance ($\lambda$ of stimulation/ $\lambda$ of emission) | Lower side stimulated emission | Sharpness/ Graininess |
|---|---|---|---|---|
| Example 13 | 1/40 | 1.7%/2.3% | 0.21 | +1/0 |
| Example 14 | 1/30 | 3.5%/2.9% | 0.29 | +1/0 |
| Example 15 | 1/20 | 5.5%/4.7% | 0.36 | +1/0 |
| Example 16 | 1/7 | 17%/16.1% | 0.53 | 0/+1 |
| Com. Ex. 9 | 1/60 | 1.6%/1.3% | 0.14 | +1/−1 |
| Com. Ex. 10 | 1/5 | 24%/21% | 0.79 | −2/+1 |

Remarks for Examples 13–16 and Comparison Examples 9–10
  scattering length at stimulation wavelength:
    9.1 $\mu$m (Example 13), 9.8 $\mu$m (Example 14),
    10.5 $\mu$m (Example 15), 12 $\mu$m (Example 16),
    8.4 $\mu$m (Com. Ex. 9), 15 $\mu$m (Com.Ex. 10).
  scattering length at stimulated emission wavelength:
    8.4 $\mu$m (Example 13), 9 $\mu$m (Example 14),
    9.7 $\mu$m (Example 15), 11.1 $\mu$m (Example 16),
    7.6 $\mu$m (Com. Ex. 9), 14 $\mu$m (Com.Ex. 10).
Common Remarks for Examples 13–16 and Comparison Examples 9–10
  thickness of phosphor layer: 270 $\mu$m
  phosphor particle average size: 5 $\mu$m
  absorption length at stimulation wavelength: 1.4 mm absorption length at stimulated emission wavelength: 1.2 mm The results of evaluations indicate that the radiation image storage panels according to the invention give, in the double side reading system, a reproduced radiation image of high quality which is well balanced between the sharpness and the graininess.

What is claimed is:

1. A radiation image storage panel having a stimulable phosphor layer which is used in a radiation image recording and reproducing method comprising applying a stimulating light to one surface side of the phosphor layer and collecting stimulated emission from the phosphor layer on both surface sides, wherein the phosphor layer has an optical transmittance varying along depth of the phosphor layer at each of wavelengths of the stimulating light and the stimulated emission.

2. The radiation image storage panel of claim 1, wherein the optical transmittance on the surface side to which the stimulating light is applied is lower than that on the other surface side.

3. The radiation image storage panel of claim 2, wherein the stimulable phosphor layer comprises two or more stimulable phosphors having different light reflectances and a stimulable phosphor having the maximum light reflectance resides predominantly on the surface side opposite to the surface side to which the stimulating light is applied.

4. The radiation image storage panel of claim 2, wherein the stimulable phosphor layer comprises two or more stimulable phosphor sub-layers and the light transmittance of the sub-layer on the surface side to which the stimulating light is applied is lower than that of the sub-layer on the opposite surface side.

5. The radiation image storage panel of claim 4, wherein the sub-layer on the surface side opposite to the surface side to which the stimulating light is applied has a light transmittance of 2 to 30% at each wavelength.

6. The radiation image storage panel of claim 4, wherein the stimulable phosphor layer comprises two or more stimulable phosphors having different light reflectances and a stimulable phosphor having the maximum light reflectance resides predominantly in the sub-layer on the surface side opposite to the surface side to which the stimulating light is applied.

7. A radiation image recording and reproducing method which comprises the steps of:
irradiating one surface of a radiation image storage panel with radiation having passed through an object or having been emitted by an object to record a radiation energy image of the object on the radiation image storage panel having a stimulable phosphor layer that has an optical transmittance varying along depth of the phosphor layer at each of wavelengths of stimulating light and stimulated emission;
sequentially exciting the radiation image storage panel by applying the stimulating light to one surface of the storage panel to release the radiation energy recorded in the phosphor layer as the stimulated emission;
photoelectrically detecting the stimulated emission from the excited surface and the opposite surface of the storage panel to obtain electric signals; and
reproducing the radiation image of the object as a visible image from the electric signals.

8. The radiation image recording and reproducing method of claim 7, wherein the optical transmittance on the surface side of the radiation image storage panel to which the stimulating light is applied is lower than that on the other surface side.

9. The radiation image recording and reproducing method of claim 7, wherein the stimulable phosphor layer comprises two or more stimulable phosphors having different light reflectances and a stimulable phosphor having the maximum light reflectance resides predominantly on the surface side opposite to the surface side to which the stimulating light is applied.

10. A radiation image storage panel comprising a transparent support film, a stimulable phosphor layer, and a transparent protective film, which is used in a radiation image recording and reproducing method comprising applying a stimulating light to one surface side of the phosphor layer and collecting stimulated emission from the phosphor layer on both surface sides, wherein the phosphor layer has a total optical transmittance in the range of 2 to 20% at a peak wavelength of a stimulation spectrum of the stimulable phosphor.

11. The radiation image storage panel of claim 10, wherein the phosphor layer of the radiation image storage panel has a total optical transmittance in the range of 2 to 20% at a peak wavelength of a stimulated emission spectrum of the stimulable phosphor.

12. The radiation image storage panel of claim 11, wherein the phosphor layer of the radiation image storage panel has a scattering length of 3 to 12 $\mu$m, said scattering length being measured at the maximum peak wavelength of the stimulated emission spectrum.

13. The radiation image storage panel of claim 10, wherein the phosphor layer of the radiation image storage panel has a scattering length of 3 to 12 $\mu$m, said scattering length being measured at the maximum peak wavelength of the stimulation spectrum.

14. The radiation image storage panel of claim 10, wherein the stimulable phosphor layer has a thickness of 100 to 380 $\mu$m.

15. A radiation image storage panel comprising a transparent support film, a stimulable phosphor layer, and a transparent protective film, which is used in a radiation image recording and reproducing method comprising applying a stimulating light to one surface side of the phosphor layer and collecting stimulated emission from the phosphor layer on both surface sides, wherein the phosphor layer has a total optical transmittance in the range of 2 to 20% at a peak wavelength of a stimulated emission spectrum of the stimulable phosphor.

16. The radiation image storage panel of claim 15, wherein the phosphor layer of the radiation image storage panel has a scattering length of 3 to 12 $\mu$m, said scattering length being measured at the maximum peak wavelength of the stimulated emission spectrum.

17. The radiation image storage panel of claim 15, wherein the stimulable phosphor layer has a thickness of 100 to 380 $\mu$m.

18. A method for reading a radiation image storage panel which comprises the steps of:
applying a stimulating light to a radiation image storage panel comprising a transparent support film, a stimulable phosphor layer, and a transparent protective film, said phosphor layer having a total optical transmittance in the range of 2 to 20% at a peak wavelength of a stimulation spectrum of the stimulable phosphor and containing a radiation energy, said stimulating light having a wavelength within ±20% of the maximum peak wavelength of the stimulation spectrum of the stimulable phosphor, through the transparent protective film, to release the radiation energy contained in the phosphor layer as stimulated emission;
collecting the stimulating emission from both surface sides of the storage panel; and
photoelectrically converting the collected emission to digital signals.

* * * * *